United States Patent [19]

Weber

[11] Patent Number: 5,064,457

[45] Date of Patent: Nov. 12, 1991

[54] PARTICULATE CONTAINMENT CONTROL SYSTEM

[75] Inventor: Victor Weber, St. Paul, Minn.

[73] Assignee: VWE, Inc., St. Paul, Minn.

[21] Appl. No.: 649,688

[22] Filed: Feb. 1, 1991

[51] Int. Cl.[5] .............................................. B01D 46/00

[52] U.S. Cl. ..................................... 55/385.2; 55/467; 55/473; 98/115.3

[58] Field of Search ....................... 55/385.2, 467, 473; 98/115.3

[56] References Cited

U.S. PATENT DOCUMENTS

| | | | |
|---|---|---|---|
| 4,217,116 | 8/1980 | Seever | 55/96 |
| 4,312,645 | 1/1982 | Mavtos et al. | 55/213 |
| 4,604,111 | 8/1986 | Natale | 55/467 |
| 4,801,312 | 1/1989 | Mateson | 55/97 |
| 4,963,170 | 10/1990 | Weber | 55/385.2 |

*Primary Examiner*—Bernard Nozick

*Attorney, Agent, or Firm*—Harpman & Harpman

[57] ABSTRACT

A negative pressure control system for protection from airborne asbestos particles, gases and the like from a work space includes an enclosure formed of portable rigid doorway panels and doors with transoms communicating with the work space and defining an air intake and decontamination chambers, an exhaust unit having a blower and HEPA filter is positioned in the work space and discharges to the atmosphere and maintains a suitable negative air pressure in the work space and a substantial flow of air through the work space and the decontamination chambers. The enclosure may comprise a room divider and/or a temporary room in communication with the work space. The doors are normally closed as by spring action and the transom closures open responsive to air flow towards the work space and closes with the loss of negative air pressure within the work space.

9 Claims, 5 Drawing Sheets

PARTICULATE CONTAINMENT CONTROL SYSTEM

BACKGROUND OF THE INVENTION

1. Technical Field

This invention relates to systems and methods of protecting the environment from contamination from airborne asbestos particulate particles and the like during the removal of asbestos in a building or other work space.

2. Description of Prior Art

Prior Art devices of this type have relied on a variety of different designs, see for example U.S. Pat. Nos. 4,674,111, 4,801,312, 4,312,645 and 4,217,116.

In U.S. Pat. No. 4,674,111 an enclosure and temporary wall is disclosed in which doorways are forms and air flow controlled by "flap seals" formed by plastic film sheets.

U.S. Pat. No. 4,801,312 discloses a work space and a plurality of rooms forming decontamination areas communicating therewith and "flap seals" doorways formed of sheets of plastic film.

U.S. Pat. No. 4,312,645 is directed towards a separator assembly in which a filter is mounted within an air duct so that at least a section of the filter element is movable between a filtering position and a by-pass position depending on air passage through the duct.

In U.S. Pat. No. 4,217,116 a method and apparatus for cleaning of surface of filtered panels in a fluid passageway is disclosed in which a filter panel is selectively moved in and out of position extending across a air flow passageway so that particulate matter collected on the panel can be removed responsive to the movement of a baffle plate from the normal position out of the passageway into a blocking of the passageway.

U.S. statutory invention registration no. H 460 discloses a similar arrangement of a work place and a decontamination room having doorways with hinged doors all but one of which are provided with fixed louvers.

SUMMARY OF THE INVENTION

A negative pressure control system used in temporarily isolating asbestos removal work area from adjacent areas uses rigid doorway panels having spring hinged solid doors and transom openings with pivoted closures to form dividing walls, airlocks and decontamination chambers. The rigid doorway panels are interconnected to one another by a PVC tubing frame engaging the rigid doorway panels through openings in the corners of same. A plastic film tube encloses the adjacent rigid doorway panels and PVC tubing frame forming the top, bottom and side walls of the decontamination chambers and seals to the respective rigid doorway panels.

DESCRIPTION OF THE PREFERRED EMBODIMENT

Figure 1:
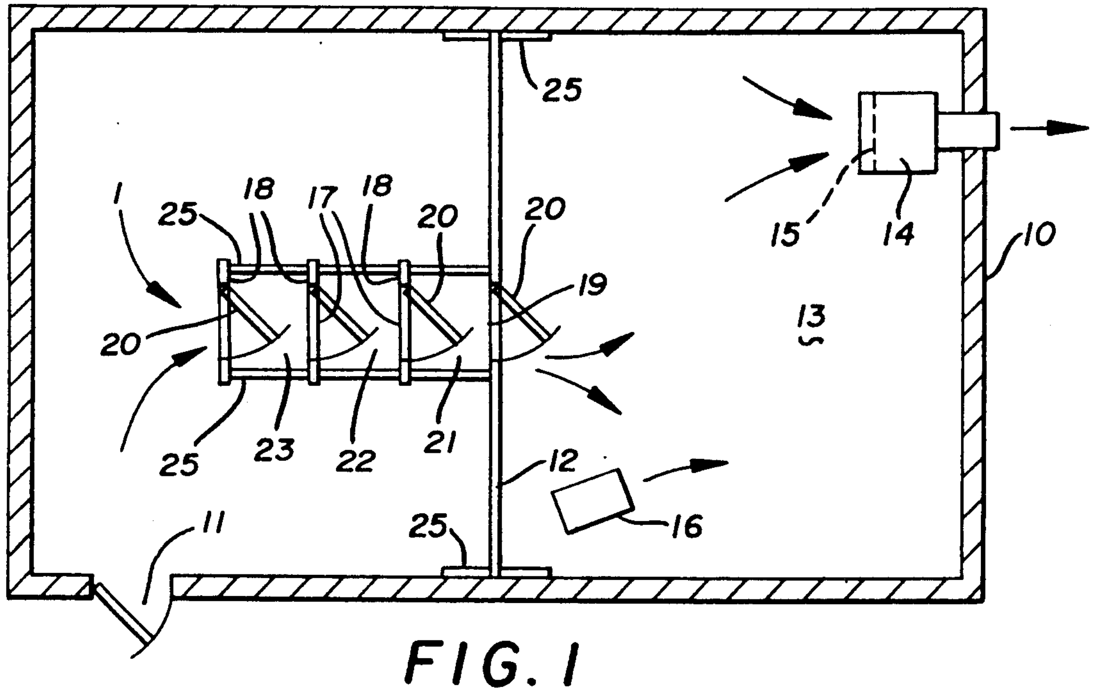
FIG. 1 is a floor plan of a work space and a decontamination system having a dividing wall and decontamination chambers.

As shown in FIG. 1 of the drawings, a wall 10 of a building with a floor and ceiling has a doorway 11 and forms an area divided by temporary wall 12 to form a work space 13 in which asbestos is being removed and which may be contaminated with airborne particles. The work space 13 is maintained at a sub-ambiant pressure (negative air pressure) e.g. 0.02 to 0.04 inches of water below ambiant pressure by means of an air exhaust device 14 including a blower and a HEPA filter 15 (High Efficiency Particular Air) which exhaust to atmosphere.

The work space 13 may have a number of free standing air filtering devices 16 which also act to increase circulation of the air in the work space 13.

Figure 7:
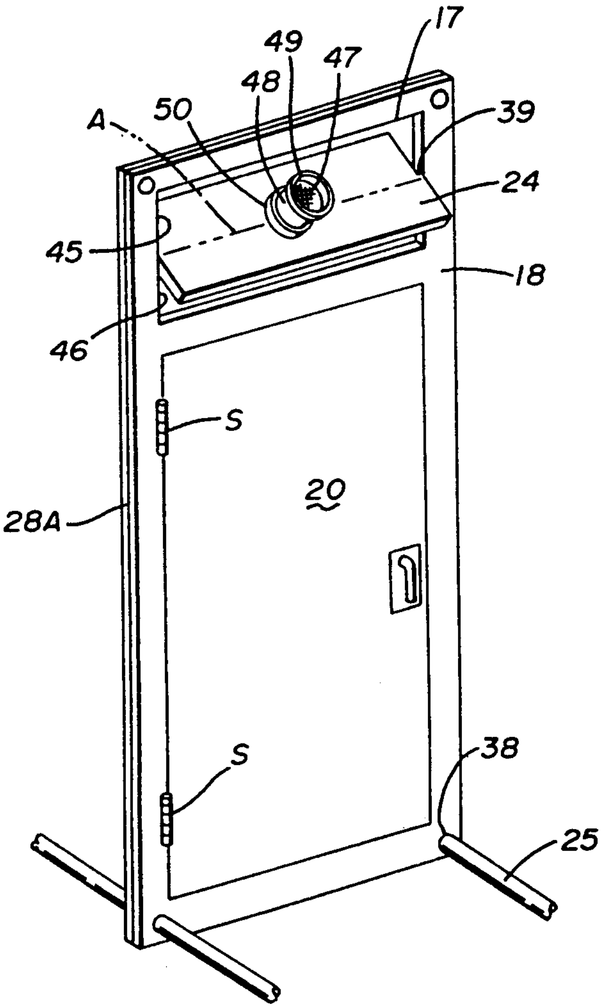
FIG. 7 is a perspective view of a rigid doorway panel with an adjustable HEPA filter weight within a pivoting closure in a transom opening.
Figure 8:
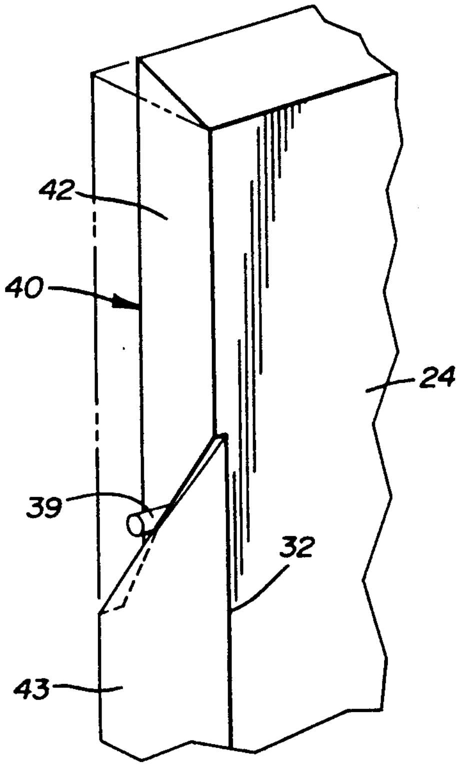
FIG. 8 is an enlarged perspective view of a hinge portion of a weighted hinge closure.
Figure 9:
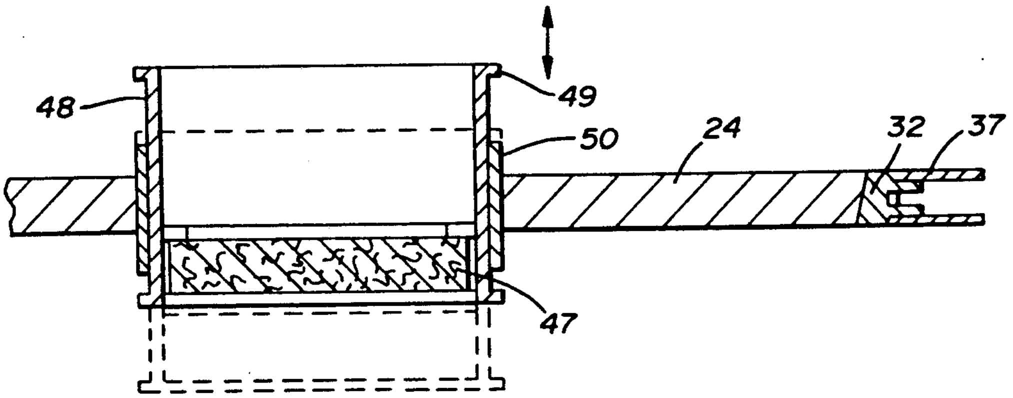
FIG. 9 is a partial cross section of the HEPA equipped closure within the transom opening.

The make up air enters the work space 13 through a transom 17 in a rigid doorway panel 18, best seen in FIG. 7 of the drawings, and through a doorway 19 when a door 20 within the rigid doorway panel 18 is open in the temporary wall 12 which can be formed of rigid panels. A portable decontamination system communicates with the doorway 19 and comprises an inner chamber 21, a middle chamber 22 which may be a shower room, and an outer chamber 23. The three chambers 21, 22, and 23 are sealed except as noted hereinafter. Each has a doorway panel 18 with normally closed solid door 20 (shown open) which is preferrably mounted on spring hinges S which urge the door 20 to closed position. Each of the doors 20 swing open towards the doorway 19 which communicates with the work space 13. Each transom 17 has a movable closure 24 within which swings open towards the work space 13 responsive to air flow created by the blower 15 as best seen in FIG. 3 of the drawings.

Figure 3:
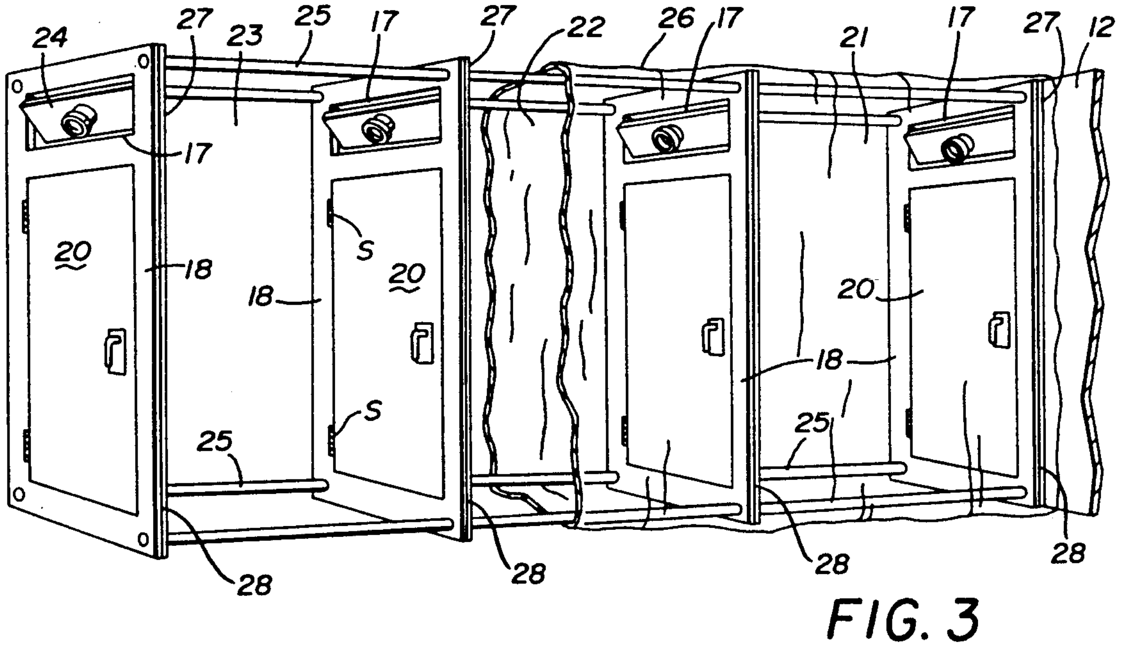
FIG. 3 is a perspective view of an assembly of decontamination chambers.

By referring to FIGS. 1 and 3 of the drawings, it will be seen that the temporary wall 12 can be formed of solid lightweight rigid panels positioned vertically and joined to one another on their upper and lower edges. Sections of tubing 25 extend perpendicular of said panels and engage the floor to hold the panels upright.

It will be seen that when the air exhaust filter and blower 14 is operating, a substantial volume of air enters the door 11 of the building 10, flows through the decontamination chambers 21, 22, and 23 and the transoms 17 in the rigid doorway panels 18 in the temporary wall 12 and is exhausted by the blower 14 after passing through the HEPA filter 15 and other free standing air filtering devices 16 where the airborne particles are removed. The environment within the work space 13 and the atmosphere outside the building 10 are thus protected.

It will also be seen that if the blower 14 stops and the sub-ambient pressure in the work space 13 rises to ambient pressure or thereabove, the four closures 24 within the transoms 17 immediately close and contamination by the contaminated airborne particles within the building 10 to the outside of the work space 13 is prevented.

By referring now to FIG. 3 of the drawings, details of the structure comprising the decontamination chambers 21, 22, and 23 may be seen.

Figure 6:
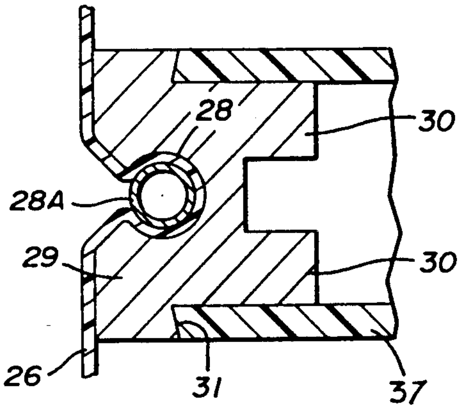
FIG. 6 is an enlarged cross section on lines 6—6 of FIG. 4 showing a door frame and door construction.

The plurality of decontamination chambers of FIG. 1 as best shown in FIG. 3 comprise the plurality of rigid doorway panels 18 with doors 20 and closures 24 within the transom 17 are arranged in spaced relation to one another and held in such position by sections of tubing 25 of equal length, preferrable PVC (polyvinyl chloride), one and one-half inches in diameter interconnected to each other and the respective rigid doorway panels 18. In FIG. 3 of the drawings, the assembled interconnected rigid doorway panels 18 with their associated solid closed doors 20 and movable transom closures 24 within the transom 17 are encased in a large plastic film sleeve 26 which is drawn around and over the entire assembly as hereinbefore described. The plastic film sleeve 26 is secured at its respective open ends to said rigid doorway panels 18 along their respective perimeter edges 27 by insertion into an elongated continuous locking channel 28 by a tubular spline element 28A. The locking channels 28 are formed within a panel framing elongated element 29 best seen in FIG. 6 of the drawings. The framing element 29 has a generally H-shaped configuration in cross section with parallel spaced legs 30 and oppositely disposed upstanding extensions 30A each having an angularly inclined outer surface at 31 adjacent said respective legs 30.

Figure 5:
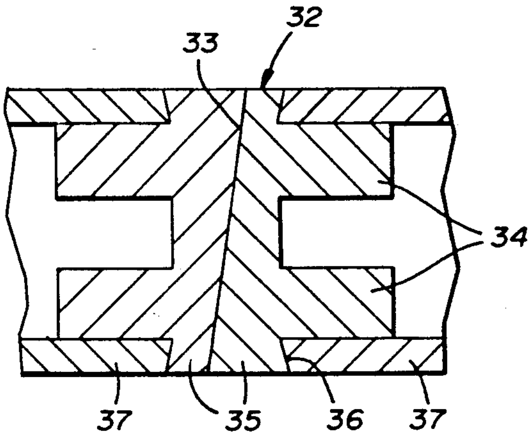
FIG. 5 is an enlarged cross section on lines 5—5 of FIG. 4.
Figure 4:
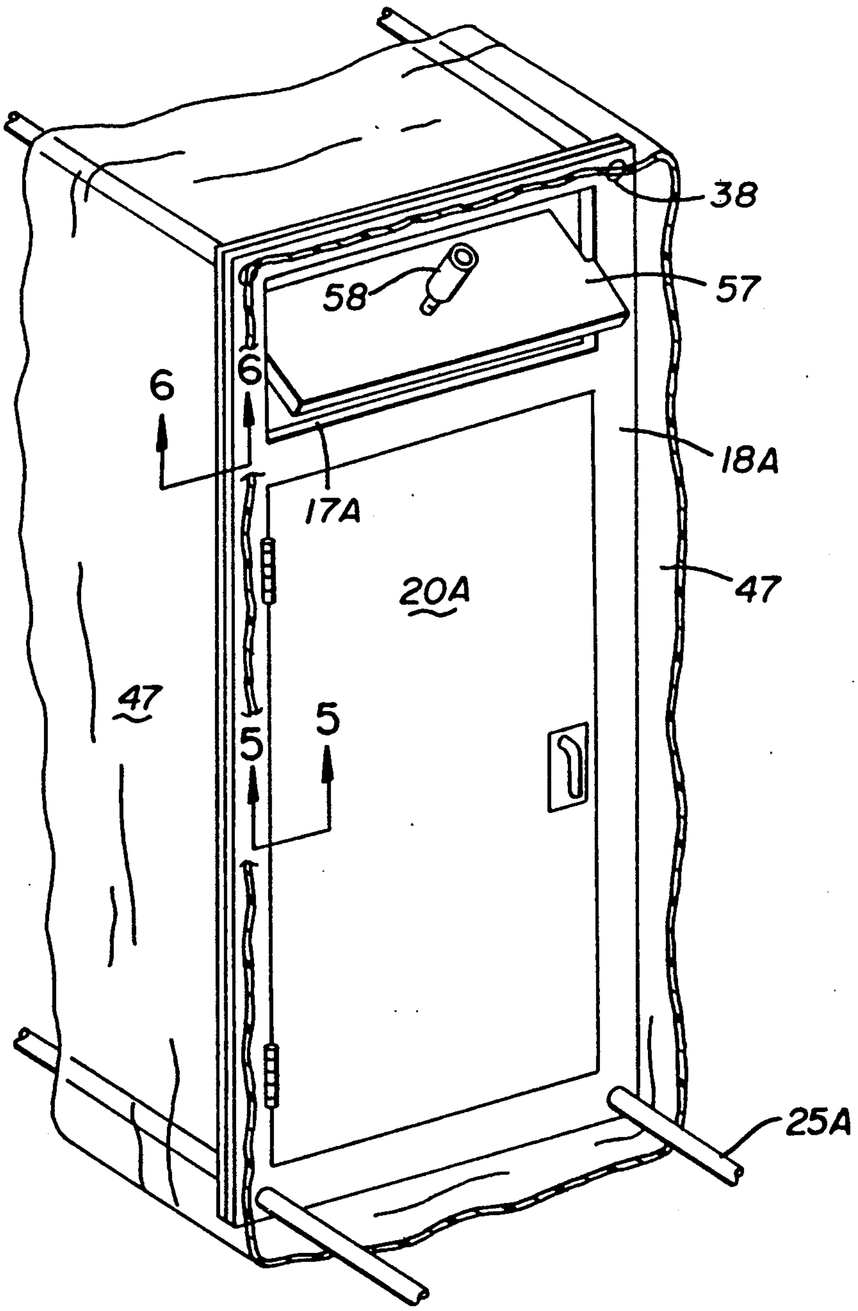
FIG. 4 is a perspective view of an alternate rigid doorway panel with a solid transom closure within.

Referring now to FIGS. 4, 5, and 7 of the drawings a doorway and transom opening frame element 32 can be seen having an angular outer surface 33 with parallel spaced legs 34 and oppositely disposed upstanding extensions 35 with respective angularly disposed surfaces 36.

Expanded plastic resin flat semi-rigid sheets 37 having an oxygen index of over 17 tested under ASTM, D-2863 as fire resistant are secured to the (as best seen in FIG. 5) respective framing elements 29 and doorway door and transom opening forming elements 32 to form the hereinbefore disclosed rigid doorway panel 18 with spaced annular openings 38 at their respective corners.

Referring now to FIGS. 3 and 7 of the drawings, the transom closure 24 has a center axis pivot at 39 that extends respectively from the closure ends 40 that are beveled in oppositely disposed angular inclination at 42 and 43 extending from said respective axis pivots at 39. A corresponding beveled configuration is formed within the transom 17 at 45 and 46 so as to register therewith. The registering beveled surfaces 42 and 43 and 45 and 46 allow for restrictive pivoting movement of the closure 24 within the transom 17 towards the work space 13 hereinbefore described. It will be evident from the above description that the perspective bevel surfaces on the closure ends 40 and the transom 17 can be formed by positioning of the hereinbefore described doorway, door and transom opening element 32 shown in FIG. 5 of the drawings.

A HEPA type filter 47 is mounted within an adjustment sleeve 48 having oppositely disposed annular flanges 49 on its respective free ends. The adjustment sleeve 48 is slideably positioned within a mounting sleeve 50 secured to and extending through the closure 24 along its longitudinal pivot axis A shown in broken lines in FIG. 7 of the drawings.

Figure 10:
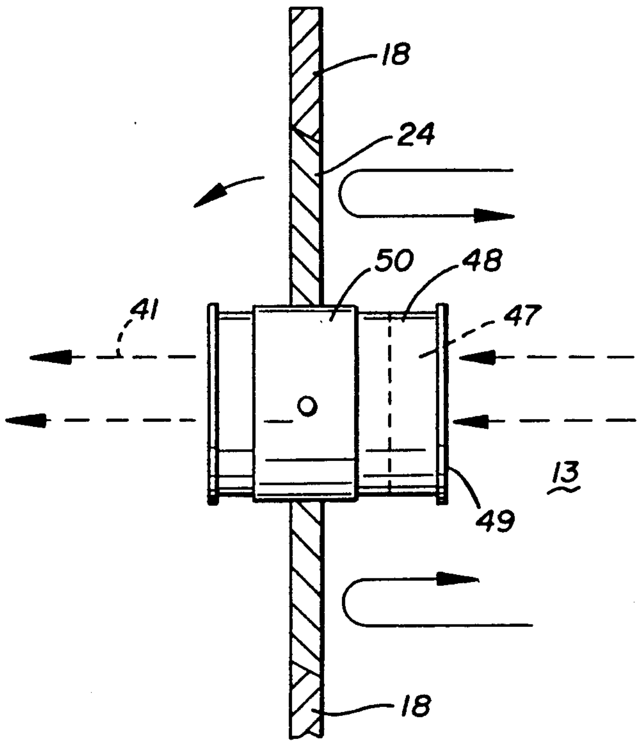
FIG. 10 is a partial sectional view of the weighted HEPA filter equipped closure within a closed transom opening depicting a filter air path through the HEPA filter.
Figure 11:
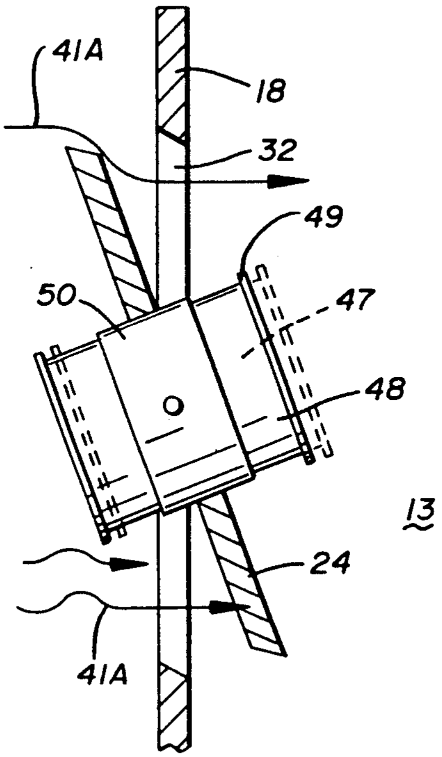
FIG. 11 is a partial sectional view of the weighted HEPA filter equipped enclosure within a transom depicting a partial opening of said closure with marginal unrestricted air flow therearound.
Figure 12:
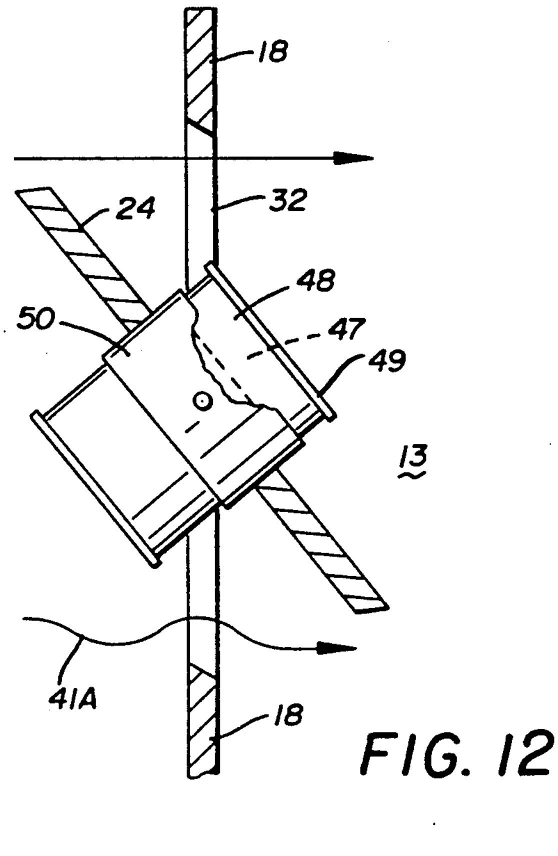
FIG. 12 is a partial sectional view of the weighted HEPA filter equipped closure within a transom depicting a full flow of air around the respective HEPA weight within.

In operation, as illustrated in FIGS. 10, 11, and 12 of the drawings, the HEPA filter 47 and sleeve 48 can be selectively moved within the mounting sleeve 50 changing the relative balance of the closure 24 within the transom 17.

In FIG. 4 of the drawings the work space 13 and general air flow direction path into same is illustrated on the right side of the closure 24 which is initially shown in a closed i.e. vertical position within the transom 17. The HEPA filter 47 filters any air flow from the work space 13 to atmosphere as indicated by arrows 41 in the event that negative air pressure is lost within the work space 13 and the air pressure would rise to ambient or above forcing contaminated air outwardly through the HEPA filter.

The closure 24 is counter-balanced by the movable sleeve 48 to close under the loss of negative air pressure within the work space 13 by placing the relative center of gravity of the closure 24 towards the work space 13.

In FIG. 11 of the drawings a negative air pressure has been established within the work space 13 and an air flow path indicated by arrows 41A into the work space 13 can be seen opening the balanced closure 24 under the positive pressure of non-contaminated air. A balance is achieved against the relative weight of the closure 24 and the air flow pressure engaging it defining a limited opening of the closure and the associated level of negative air pressure established within the work space 13.

In FIG. 12 of the drawings the adjustable position of the sleeve 48 containing a HEPA filter 47 has been changed by moving same away from the work space 13 changing the balance of the closure 24 and in turn the amount of air flow pressure required to move same allowing a larger air flow path through the transom 17 into the work space 13 as shown in FIG. 11 thereby decreasing the negative air pressure within the work space 13.

The adjustable nature of the sleeve 48 can be used to vary the negative air pressure within the work space 13 by increasing the air flow pressure needed to move the closure 24 given a constant negative air machine performance within the work space 13 as hereinbefore described.

Figure 2:
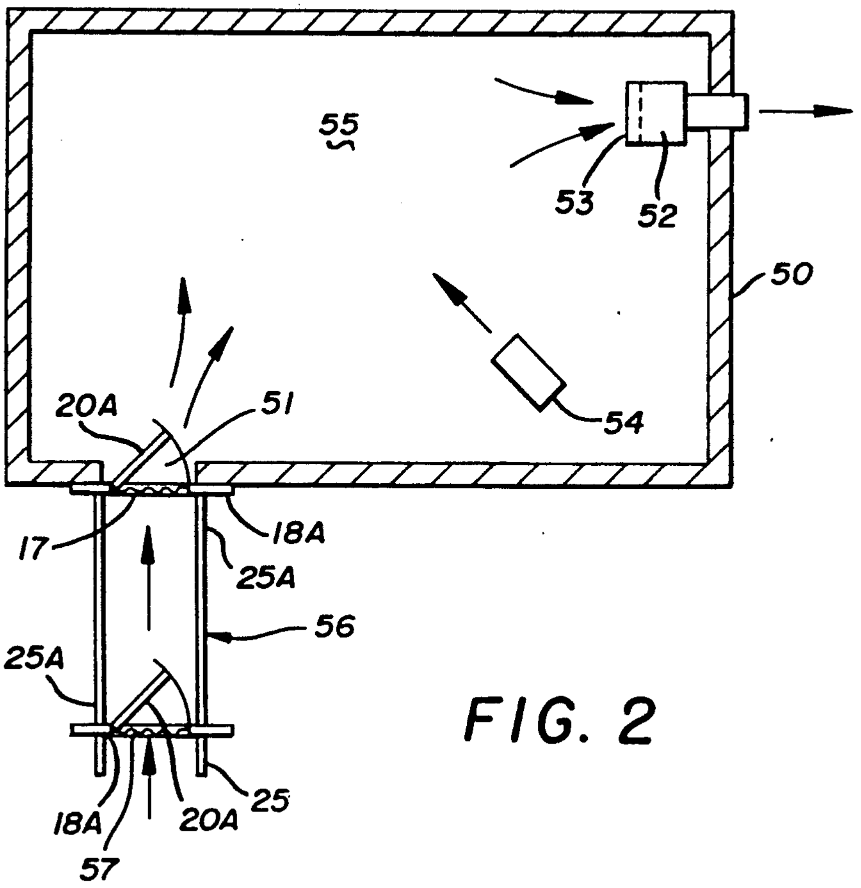
FIG. 2 is a floor plan of a work space having a decontamination enclosure.

By referring now to FIGS. 2 and 4 of the drawings, a modification of the invention can be seen comprising a building 50 having a doorway 51, a negative air machine 52 incorporating a HEPA filter 53 and a blower is arranged to exhaust to atmosphere and secondary filter and blower 54 provides additional circulation in a work space 55. A portable temporary enclosure 56 is formed of rigid doorway panels 18A and solid doors 20A and a transom 17A which are positioned upright by tubing sections 25A secured thereto and a plastic film sleeve 57 as hereinbefore described in connection with FIGS. 3 and 7 of the drawings.

Arrows show air flow through the enclosure 56 into the work space 55 and through an airlock 56A defined between said doors 20A.

In FIG. 4 of the drawings, a modification of the rigid doorway panel 18A may be seen to comprise the solid weighted transom closure 57 having an adjustable weight 58 secured to the closure 57 which allows for relative change in balance of the closure 57 within the transom 17A by varying the position of the adjustable weight 58 as clearly seen.

Tubing sections 25A as hereinbefore described support the modified rigid doorway panels 18A which can also be used with the systems of FIGS. 1 and 3 of the drawings.

It will occur to those skilled in the art that the temporary dividing wall 12 can be modified by forming the wall, if necessary, of plastic film sheets (not shown) such as polyethylene or the like secured to the wall 10, the floor and the ceiling of the building will be well understood by those skilled in the art.

It will also be apparent to those skilled in the art that the direction in which the spring urged doors 20 open can be changed by reversing the closure mechanism so as to meet any state or federal requirement relative to exit door opening direction.

In operation utilizing the above referred to particulate contamination control system, it will be impossible to have a positive air pressure within the work space since filtered venting takes place even upon loss of negative air pressure machines and associated exhaust fans and blowers by utilization of the HEPA filter within the closures 24 that allow filtered air to escape in such an event.

It will also be apparent from the above referred to description that the negative air control system can also be used in a pressurized positive clean room configuration where the air exhaust device 14 is reversed i.e. pumping in "clean filtered air" into the work space 13.

In this modification the air filtering device 16 is eliminated and the doors 20 and transom closures 24 are reversed so as to open in opposite direction under positive pressure within the work space 13 and close upon loss thereof.

A clean room maintains a positive filtered pressure to avoid contamination from outside contaminats which is the reverse of the negative air pressure concept disclosed within the text.

By reversing the system described above, such a positive clean room environment can be maintained as will be apparent to those skilled in the art.

It will thus be seen that I have described my invention in several embodiments and it will be understood that these are only examples and not limitations of the scope of the invention as set forth in the following claims:

I claim:

1. In a system for establishing a favorable environment for removing dangerous particulate forming solid materials, including asbestos, said system comprising;

wall means defining a work space and enclosing an air space communicating with said work space, said wall means including at least one inlet for air to enter said air space and an outlet for air to exit from said air space, said air space defining at least one decontamination chamber, a filter and air moving means for producing a negative air pressure within said work space and for drawing air into said work space through said inlet and for moving air through said filter and said outlet, the improvement comprising;

said wall means consisting of a plurality of rigid doorway panels and plastic film, doorways in said rigid doorway panels, doors in said doorways, transoms in said rigid panels, movable closures in said transoms, a HEPA filter within said closure, means for moving said HEPA filter within said closure, means urging said doors to closed position in said doorways, a plurality of tubing registering in openings in said rigid doorway panels so as to hold said rigid doorway panels upright and in spaced relation to one another, said plastic film positioned around said rigid doorway panels and said tubing sections to form a continuous wall defining at least one enclosure, means for sealing said plastic film to some of said rigid doorway panels, means for urging said closures in said transom to closed position, an air moving means acting to move said closures to open position when operating.

2. The apparatus of claim 1 wherein some of said tubing sections are positioned between said rigid doorway panels and the remainder of said tubing sections extend outwardly from a rigid panel to rest on a horizontal supporting surface.

3. The apparatus of claim 1 wherein a plurality of said rigid doorway panels having doorways therein and doors in said doorways and transoms and closures in said transoms are arranged in a structure to define at least three decontamination chambers in a row with the transom on one end forming said air inlet and the transom on the other opposite end communicating with said work space.

4. The apparatus of claim 1 wherein said rigid doorway panels, closures in said transoms, and said tubing are of a plastic resin material having an oxygen index of over 17 tested under ASTM, D-2863 fire resistant rating.

5. The apparatus of claim 1 wherein said means urging said closures in said transoms to closed position consist of weights on said closure, said weights bein of a known size so as to counter-weight the closures to move the same to closed position upon loss of said negative air pressure in said work space.

6. The apparatus of claim 5 wherein said weights on said doors consist of a movable HEPA filter mounted in said closure communicating with said work space, said HEPA filter of a known size so as to counter-weight the closure to move the same to closed position upon loss of said negative air pressure in said work space.

7. The apparatus of claim 1 wherein said means for sealing said plastic film to some of said rigid doorway panels comprises a continuous locking channel in said panels, a resilient spline registering in said locking channel.

8. The apparatus of claim 1 wherein said rigid doorway panels comprise a perimeter frame element and a interior doorway, door and transom frame element, rigid lightweight plastic resin sheets interconnecting said framing elements.

9. The apparatus of claim 8 wherein said doorway, door and transom frame element comprises an angularly outer surface, oppositely disposed upstanding extensions, said extensions having angularly disposed surfaces engaging said rigid lightweight resin sheets.

* * * * *